United States Patent [19]
Remboski et al.

[11] Patent Number: 5,841,025
[45] Date of Patent: Nov. 24, 1998

[54] MISFIRE DETECTION METHOD AND APPARATUS

[75] Inventors: Donald J. Remboski, Dearborn; Steven L. Plee, Brighton; Marvin L. Lynch, Detroit; Michael A. McClish, Northville; Susan K. Sonday, Dearborn, all of Mich.

[73] Assignee: Motorola Inc., Schaumburg, Ill.

[21] Appl. No.: 415,115

[22] Filed: Mar. 31, 1995

[51] Int. Cl.$^6$ .................................................. G01M 15/00
[52] U.S. Cl. ................................................................ 73/117.3
[58] Field of Search ........................... 73/116, 117.3, 73/35.01, 35.03, 35.06, 112, 117.2, 511

[56] References Cited

U.S. PATENT DOCUMENTS

| | | | |
|---|---|---|---|
| 5,044,194 | 9/1991 | James et al. | 73/117.3 |
| 5,044,195 | 9/1991 | James et al. | 73/117.3 |
| 5,222,392 | 6/1993 | Baba et al. | 73/116 |
| 5,237,862 | 8/1993 | Mangrulkar et al. | 73/116 |
| 5,269,178 | 12/1993 | Vigmostad et al. | 73/116 |
| 5,305,635 | 4/1994 | James et al. | 73/116 |
| 5,353,634 | 10/1994 | Baba et al. | 73/116 |
| 5,359,518 | 10/1994 | Wimmer | 73/116 |
| 5,365,780 | 11/1994 | Feldkamp | 73/117.3 |
| 5,377,536 | 1/1995 | Angermaier et al. | 73/116 |
| 5,390,537 | 2/1995 | Kuroda et al. | 73/117.3 |
| 5,440,922 | 8/1995 | Ichikawa | 73/117.3 |
| 5,447,061 | 9/1995 | Fujiki | 73/117.3 |
| 5,452,604 | 9/1995 | Namiki et al. | 73/117.3 |
| 5,508,927 | 4/1996 | Remboski, Jr. et al. | 73/117.3 |
| 5,509,302 | 4/1996 | Drexel et al. | 73/117.3 |
| 5,515,720 | 5/1996 | Remboski, Jr. et al. | 73/117.3 |

*Primary Examiner*—Richard Chilcot
*Assistant Examiner*—Eric S. McCall
*Attorney, Agent, or Firm*—Nicholas C. Hopman

[57] ABSTRACT

A misfire detection method and apparatus includes measurement of combustion induced torque in an internal combustion engine and provision of time-ordered first, second, and third acceleration data samples dependent on the torque. A misfire is indicated when a magnitude of the second acceleration data sample has a magnitude less than a misfire threshold, and less than a magnitude of both the first and third acceleration data samples.

12 Claims, 4 Drawing Sheets

-PRIOR ART-

MISFIRE DETECTION METHOD AND APPARATUS

FIELD OF THE INVENTION

This invention is generally directed to the field of misfire detection for internal combustion engines, and specifically directed to various threshold strategies for misfire detection.

BACKGROUND OF THE INVENTION

Contemporary internal combustion engines operate under the direction of electronic control systems. One advantage of electronic control systems is that they can be used to determine a combustion misfire—or an improper burning of an air-fuel mixture in a cylinder.

That said, there are many schemes for detecting misfire—but none that have been devised that detect misfire under all vehicle operating conditions. Many prior art systems measured engine velocity and/or acceleration and predicted misfire based on observing engine velocity and/or acceleration outside of behavior attributable to normal combustion. FIG. 1 illustrates a typical prior art engine behavioral measurement system for observing engine velocity and/or acceleration. The system includes an encoder wheel 101 driven by an engine's crankshaft. A sensor 103, such as a variable reluctance type, is positioned to detect radial movement of the encoder wheel 101. A signal 105, indicative of the sensed radial movement of the encoder wheel 101 driven by the engine, is output from the sensor 103 into a signal processing system 107. As mentioned above the signal processing system 107 can act on both or either of velocity and acceleration behavior of the signal 105. A misfire indication is provided as a misfire signal 109 when the engine velocity and/or acceleration operates outside of behavior attributable to normal combustion.

In general, the above-described type prior art approach does not work well over all vehicle operating conditions. Contemporary emissions laws mandate misfire detection over an increasingly broader set of vehicle operating conditions. It has been particularly difficult to detect misfire when the powertrain's driveline is perturbating. This is because engine velocity and/or acceleration behavior, caused by driveline perturbation, can behave much like a misfiring cylinder. Driveline perturbation, or disturbance, can be caused by many sources. One source is a rough road condition—such as that caused by driving over a pothole.

FIG. 2 is a chart showing an example of a waveform illustrative of an engine's crankshaft acceleration behavior during a vehicle's traversal across a pothole. An acceleration waveform 201 is representative of an engine's crankshaft acceleration behavior over a period of several seconds. A reference axis represents an average acceleration of the engine's crankshaft. During proper combustion the acceleration waveform will remain near zero, during improper—or incomplete combustion the acceleration waveform will transition to a negative portion 207 of the chart, and during driveline induced noise, as will be described briefly the acceleration will transition both in a positive and a negative direction. In a typical misfire detection system, a threshold 209 is set. If the acceleration waveform transitions in a negative direction beyond the established threshold 209, then a misfire is indicated. Reference number 211 refers to a portion of the acceleration waveform 201 indicating misfiring behavior.

When the engine's vehicle traverses over a pothole, a large disturbance occurs in the engine crankshaft acceleration behavior. Notice that this disturbance has a bipolar characteristic, that is, it extends both into the positive portion 205 of the chart and the negative portion 207 of the chart. This disturbance is caused in part by a ringing of the vehicles driveline—stimulated by traversal across the pothole. Of particular concern is a portion 213 of the acceleration waveform 213 crossing the misfire threshold 209 related to the pothole disturbance. It would appear to the misfire detection system as a misfiring condition when it may not be. Prior art solutions for this problem were to have a separate vehicle mounted sensor to sense abrupt vibrations to the vehicle's body and to gate-off the misfire detection system. This is not only an economically costly solution but also unreliable and more difficult for vehicle assemblers because of the separate sensor.

Another problem with prior art acceleration based misfire detection systems is the difficulty of identifying which cylinder misfired. Acceleration waveforms derived from the engine's crankshaft are inherently noisy. Furthermore, normal combustion behavior, as well as torsional vibration caused by stiffness and various moments of inertia of the engine's crankshaft, exhibit strong spectral behavior substantially above spectral behavior attributable to misfire. Because of this the acceleration signal derived from the engine's crankshaft is often spectrally filtered with a lowpass filter. To be effective the lowpass filter often needs to be tuned based on various measured engine operating conditions such as speed and load. An example of this type of acceleration signal filtering has been described in Patent Application Ser. No. 08/279,966. Because the lowpass filtering may need to be substantial (in terms of spectral proximity to the misfire spectra), the lowpass filtering may cloud the determination of the misfiring cylinder. An example of this is illustrated in FIG. 3.

FIG. 3 shows various waveforms indicative of acceleration behavior of an engine crankshaft. These waveforms have been lowpass filtered to substantially eliminate spectra induced by system noise, normal combustion behavior, and crankshaft torsional behavior. A first acceleration waveform 301 is filtered with a lowpass filter adjusted to reject spectra above one cycle per engine revolution. A second acceleration waveform 303 is filtered with a lowpass filter adjusted to reject spectra above one-tenth cycle per engine revolution. The tuning of the lowpass filter to reject spectra above one-tenth cycle per engine revolution is useful when the engine is operating at a very high speed—when system noise caused by mechanical components is very high.

Reference lines 305 illustrate timing of acceleration data sample acquisition from the engines crankshaft by the system shown in FIG. 1, and reference number 209 shows the earlier-described misfire threshold. The acceleration data sample acquisition rate shown here is significantly slower than the actual acceleration sampling rate of the system shown in FIG. 1. Each reference line indicates an acceleration measurement at a time of each cylinder's expansion (power) stroke. This is done to minimize resources necessary to process the acceleration data acquired. An example of this acceleration data sample decimation approach has been described in Patent Application Ser. No. 08/280,101. In the graph of FIG. 3 each of the reference lines 305 represent a single cylinder firing event in a multi-cylinder engine. Unfortunately, both filtered acceleration waveforms 301 and 303 cross-over the misfire threshold 209 over many cylinder firings. This would tend to indicate that many cylinders are misfiring—when they may not be. In fact, within this actual data a misfire is occurring coincident with reference line 307.

What is needed is an improved approach for misfire detection including an improved threshold strategy that enables misfire detection over a wider variety of vehicular operating conditions.

DETAILED DESCRIPTION OF A PREFERRED EMBODIMENT

A misfire detection method and apparatus includes several related techniques to improve measurement of misfire behavior over a wider variety of vehicular operating conditions. The technique applied depends on whether or not the misfire behavior appears to be occurring intermittently (a soft misfire), or regularly (a hard misfire).

Figure 2:
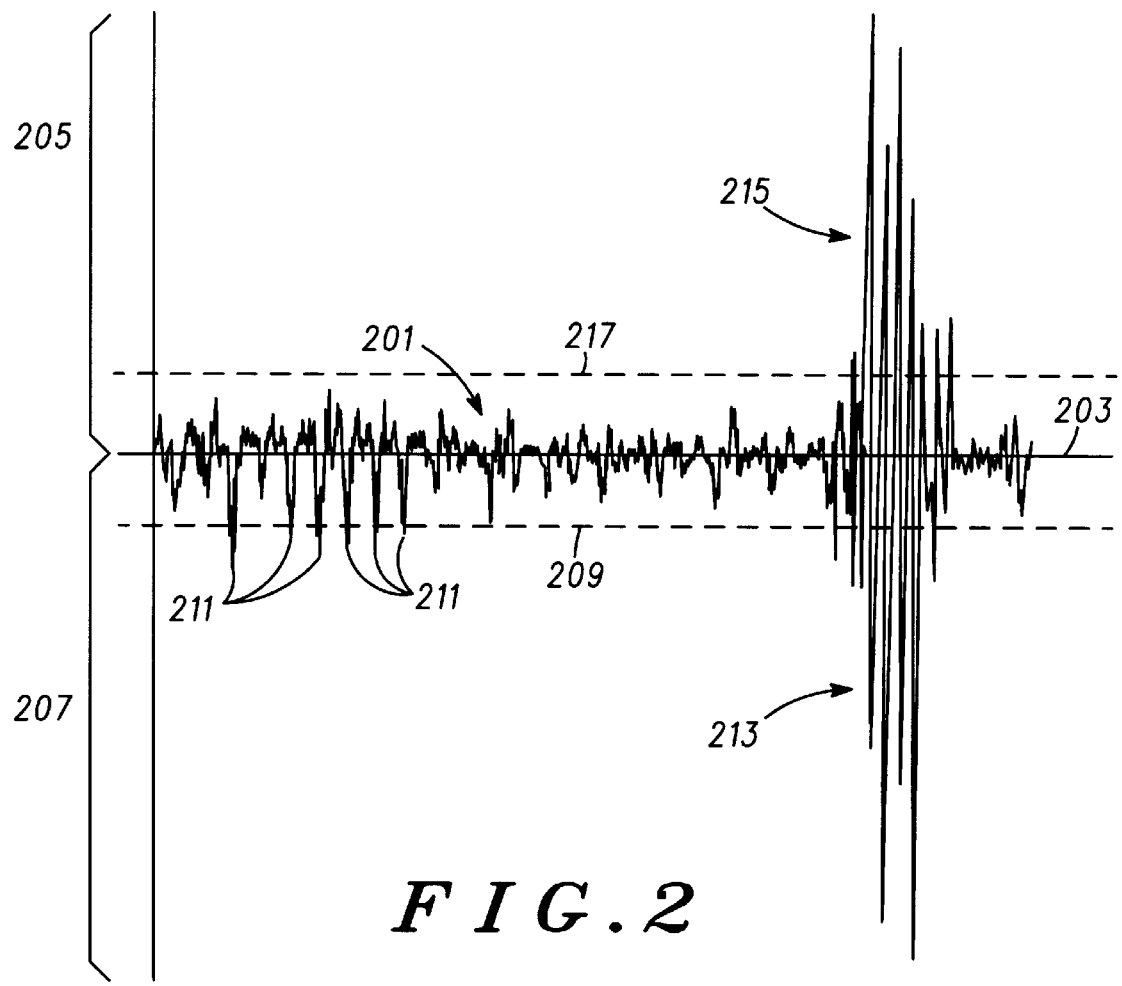
FIG. 2 is a graph of an acceleration waveform indicative of engine crankshaft behavior caused by combustion induced torque and other driveline behaviors including a rough road surface disturbance.

For the soft misfiring case (for instance a pothole induced driveline disturbance) the engine crankshaft acceleration waveform 201 shown in FIG. 2 is observed to see if acceleration behavior 215 exceeds a noise-disablement threshold 217. Since the pothole induced driveline disturbance has a bipolar behavior the acceleration waveform 201 will exceed the noise-disablement threshold 217. If this behavior is detected a soft-misfire strategy is gated off until the disturbance 215 recedes. Preferably, this is accomplished by testing to see whether or not a magnitude of an acceleration data sample from the continuously acquired acceleration waveform 201 exceeds a noise-disablement threshold 217 residing in the positive portion 205 of the chart shown in FIG. 2. When it does, then the soft-misfiring strategy will be disabled until the disturbance 215 falls below the noise-disablement threshold 217. So, whenever the acceleration crosses a noise-disablement threshold 217, the system is prohibited from reporting misfires for a period of time. This prevents the negative the negative going half of the noise burst 213 from being detected as misfiring behavior. Noise detection approaches other than the later-detailed noise-disablement threshold approach may also be used to detect driveline and other potentially misfire like behaviors. For instance, an estimation of a large increase in spectral energy in the acceleration data samples could be used. This may be either measurement of a broadband or selective band increase of energy.

Figure 3:
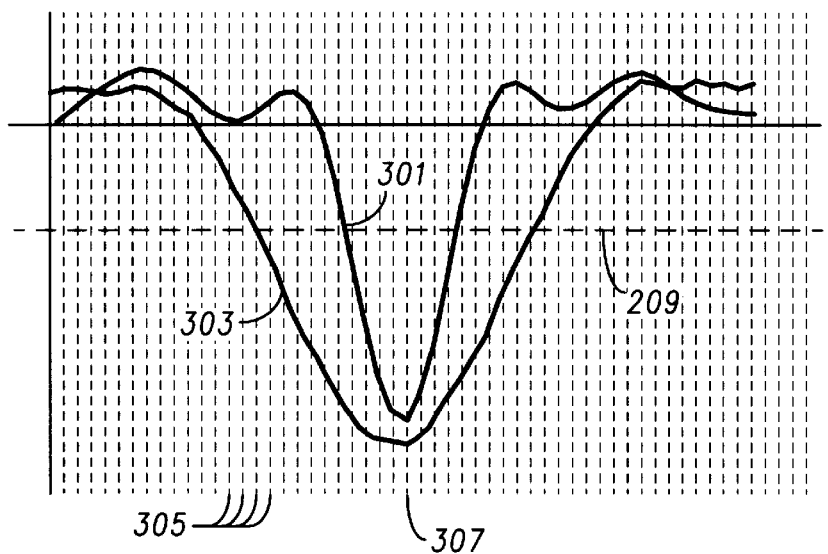
FIG. 3 is a graph of various lowpass filtered engine crankshaft acceleration waveforms.

For the hard misfiring case (for instance an ignition circuit failure where the lowpass filter masks the misfiring cylinder) the engine crankshaft acceleration waveform 301 or 303 shown in FIG. 3 is observed to find the lowest value under the misfire threshold 209. This lowest value, here incident with reference line 307 will correspond to the address of the misfiring cylinder. Preferably, this is accomplished by testing to see whether or not a magnitude of an acceleration data sample median-in-time of an odd number of time-ordered acceleration data samples continuously acquired from the engine's crankshaft, has a magnitude less than the misfire threshold, and less than a magnitude of at least a first and a last acceleration data sample of the odd number of time-ordered acceleration data samples. Then, a number of detected misfires will be counted. When a predetermined number of misfires have been counted for the particular misfiring cylinder, a misfire indication will be given.

To better understand the key aspects of a preferred embodiment several new figures will be introduced.

Figure 1:
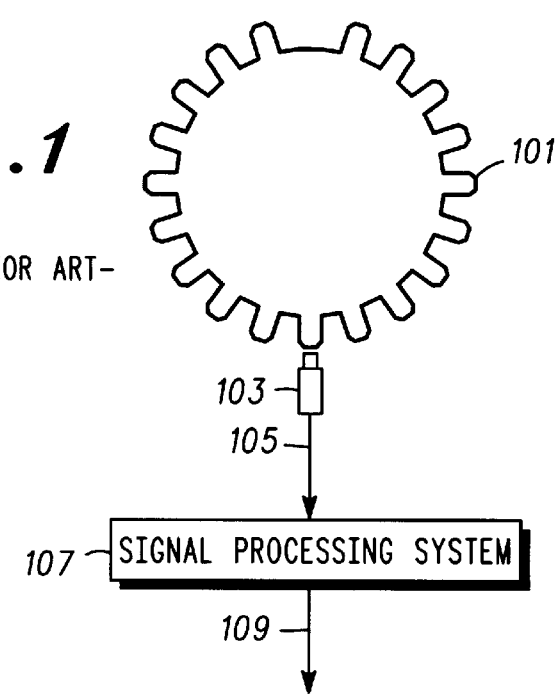
FIG. 1 is a system block diagram illustrating a typical prior art engine behavior measurement system.
Figure 4:
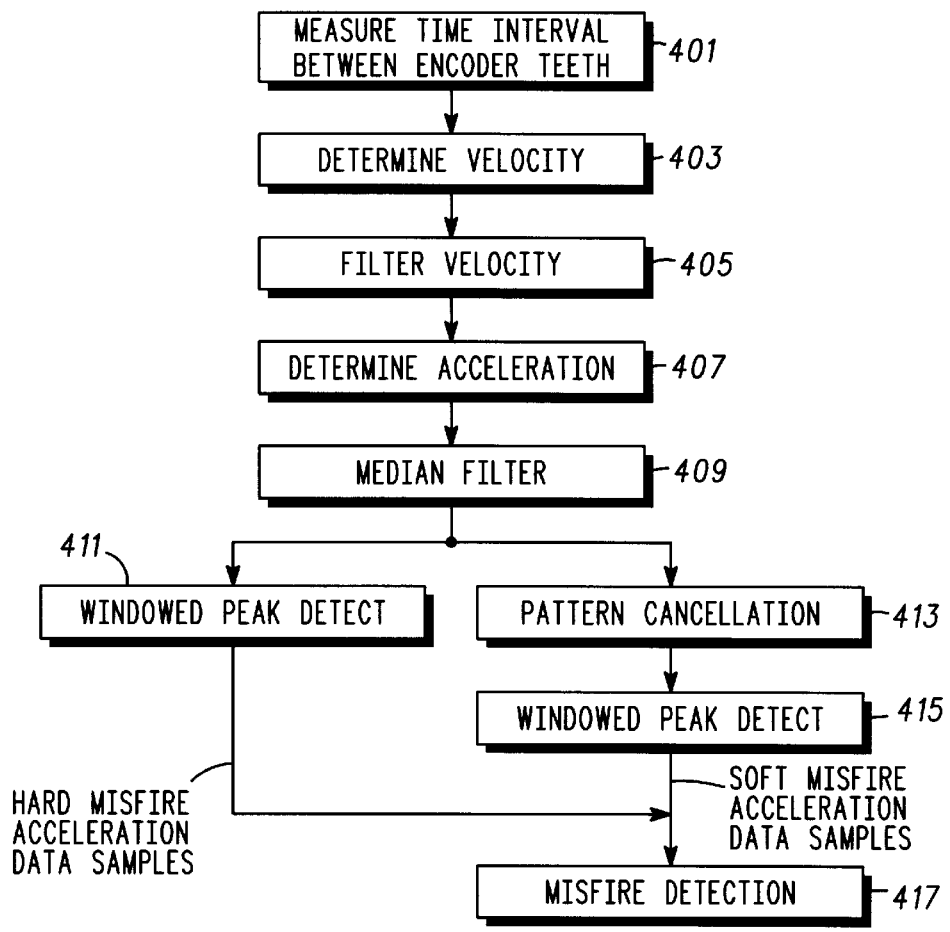
FIG. 4 is a system block diagram illustrating a general configuration of a preferred embodiment.

FIG. 4 is a system block diagram illustrating a general configuration of a misfire detection system including the new threshold determination approach. This approach uses a sampled-data or digitally implemented approach. The steps shown in FIG. 4 are executed with aid of a general purpose controller, embedded within the signal processing system 107 of FIG. 1, which includes digital signal processing capability. Preferably, the general purpose controller is microprogrammed to execute the various steps shown. Alternatively, a hard-wired logic circuit, or other means may also be used.

At a first step 401, a time interval between each of the encoder targets, or teeth, is measured as the encoder wheel 101 rotates. Then, in step 403 the measured time intervals are used to compute an angular velocity of the encoder wheel 101. Next, in step 405 the velocity is filtered to substantially remove spectra induced by system noise, normal combustion behavior, and crankshaft torsional behavior. Preferably, this filtering operation in step 405 is achieved using a lowpass filter that has filtering capability programmable dependent on measured engine load and/or engine speed. An example of this type of lowpass filter can be found in application Ser. No. 08/279,966.

Next, in step 407 an acceleration of the encoder wheel 101 is determined dependent on the filtered velocity from step 405 by calculation. Then in step 409, the determined acceleration is filtered using a median filter. Preferably the median filter in step 409 is programmable dependent on engine load and/or engine speed as described in application Ser. No. 08/279,966. The principal function of the median filter 409 is to remove very low frequency behavior from the acceleration. This may include driveline perturbations associated with, for instance, driving across a pothole. Practically, the median filter does not remove sufficient driveline disturbance to meet all misfire detection emissions requirements. Until this point in the process every encoder tooth is being processed by the signal processing steps 401–409.

Next, the process is divided into two paths to effectively recognize and process quite distinct types of misfire behavior—hard misfire and soft misfire. In a hard misfire step 411, a windowed peak detect step decimates, or selectively removes all of the acceleration data samples except the negative-most acceleration data sample within a programmable window surrounding the firing portion of each cylinder's combustion cycle. Details of an approach for accomplishing this can be found in Patent Application Ser. No. 08/280,101. The purpose of this step 411 is to minimize the resources required in post processing steps to detect misfire in step 417. The output of the windowed peak detect step is termed the hard misfire acceleration data samples.

In a soft misfire step, pattern cancellation is performed to eliminate identifiable spectral behavior at one-half-cycle-per-revolution and harmonics thereof of the engine's crankshaft. The one-cycle-per-revolution, or first-order behavior can be at least partially attributable to piston mass imbalance caused by individual cylinders having different masses. Piston mass imbalance can manifest itself in the acceleration data samples at a periodicity of one-cycle-per-revolution. Half-order effects include combustion imbalance between cylinders and can manifest itself in the acceleration data samples at a periodicity of one-half-cycle-per-revolution. Removal of these identifiable behaviors prior to decimation and detection of misfire can significantly improve misfire detection capability. Details of the pattern cancellation approach can be found in Patent Application Ser. No. 08/116,650.

Next, in step 415 another windowed peak detect step decimates, or selectively removes all of the acceleration data samples except the negative-most acceleration data sample within a programmable window surrounding the firing portion of each cylinder's combustion cycle for the soft misfire detection process.

Then, in step 417 both the hard and soft misfire acceleration data samples are further processed by the approach detailed in FIG.'s 5 and 6.

Figure 5:
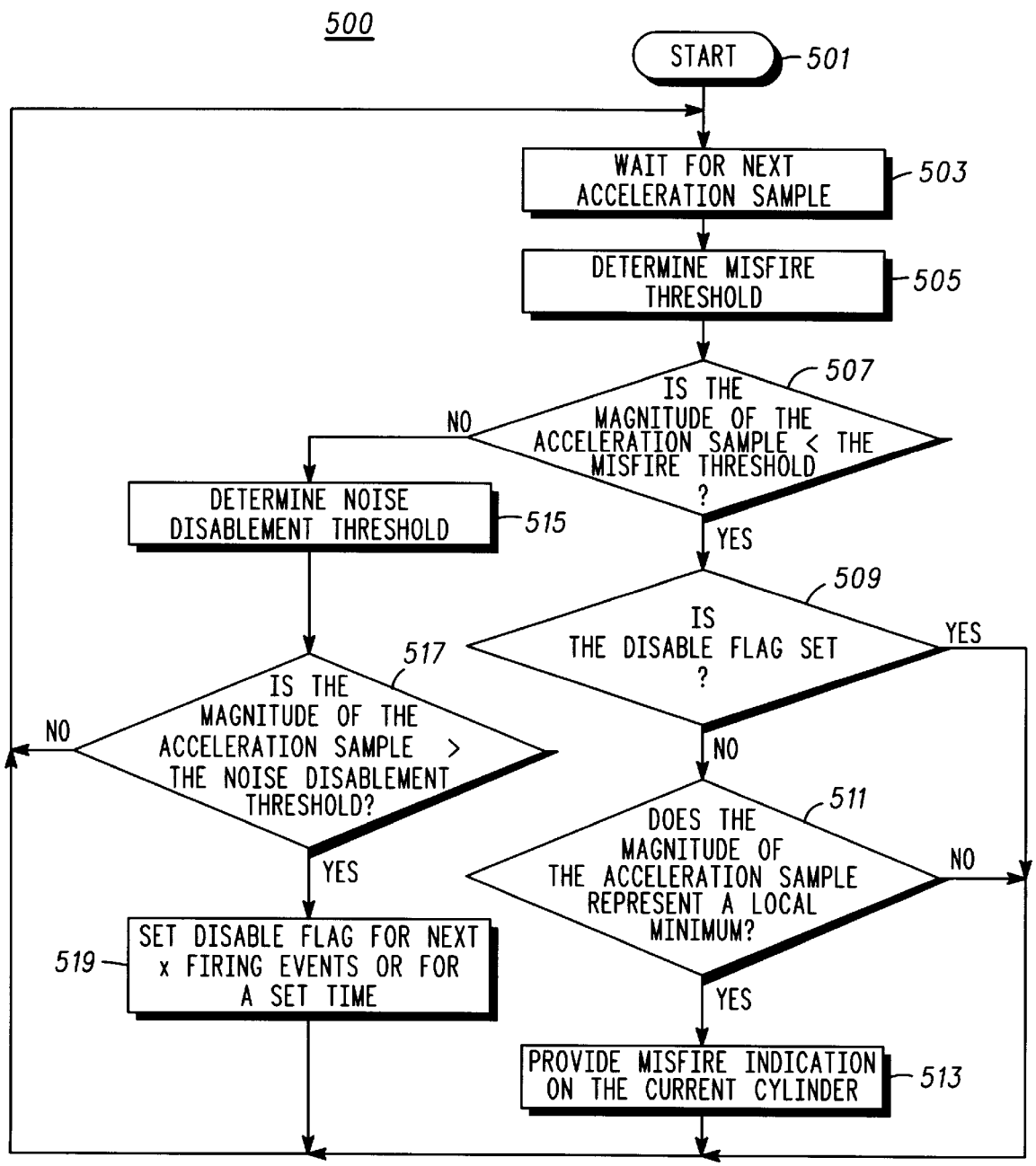
FIG. 5 is a flow chart illustrating various method steps in accordance with the preferred embodiment of the invention.

FIG. 5 is a flow chart illustrating various method steps for threshold management for indicating misfires detected in soft misfire acceleration data samples. A routine 500 is microcoded into the general purpose microcontroller mentioned earlier, and commences at step 501. In step 503 the method waits for a next acceleration data sample from the soft misfire acceleration data sample stream. When the next acceleration data sample is received a misfire threshold is determined in step 505. The misfire threshold is generally a negative number, and is preferably determined as a function of engine load, engine speed, and transmission gear.

Next, a test is made to see whether or not a magnitude of the current acceleration data sample has an amplitude less than the determined misfire threshold. If the magnitude of the acceleration data sample has a value less than the misfire threshold, then a test 509 is executed.

In the test 509, the method checks to see whether or not a noise-disablement flag is set. The noise-disablement flag could have been set earlier based on detection of noise above the earlier-mentioned noise-disablement threshold 217. If the noise-disablement flag is set, then the soft misfire detection process is aborted. The noise-disablement flag is used to gate the acceleration determination process dependent on measurement of a significant driveline disturbance as described above.

If the noise-disablement flag is not set, i.e. cleared, in step 511 the magnitude of the acceleration data sample is checked to see if it represents a local minimum. A local minimum is determined by comparing acceleration data samples from an odd number of consecutive acceleration data samples. If a time centered, or median-in-time sample has a magnitude less than a magnitude of the first and third samples, a local minimum has been detected. So, if there are three acceleration data samples and the second acceleration data sample has a magnitude lesser (more negative) that the first and third acceleration data samples, then a local minimum is declared and the misfiring cylinder can be identified as the cylinder firing coincident with the second sample. Odd sample lots other than three can be used if desired. The local minimum test can either be based on comparing the center sample to the remaining outermost samples or to all of the remaining odd number of samples. As described above, this local minimum represents an acceleration data sample caused by the misfiring cylinder. If a local minimum has been detected, then a misfire indication is provided for the current cylinder under analysis in step 513.

The routine 500 is then iterated until the test in step 507 results in a "no" indication. If the magnitude of the current acceleration data sample does not have a magnitude with a value less than the misfire threshold, then step 515 is executed.

In step 515, a noise-disablement threshold is determined. Generally this noise-disablement threshold is a positive number, and is preferably a function of engine load and/or engine speed and/or transmission gear.

Next, in step 517, a test is made to find out whether or not the magnitude of the current acceleration data samples has a value greater than the noise-disablement threshold. If the magnitude of the acceleration data sample has a value greater than the noise-disablement threshold, then step 519 is executed.

In step 519, a noise-disablement flag is set for a determined amount of time. This determined amount of time can be dependent on a number of firing events, or a preset fixed time duration and is at least partially dependent on empirical factors associated with the engine, powertrain, and vehicular application. As mentioned above, the time that the noise-disablement flag is set is dependent on the time that the crankshaft is perturbating or ringing. If the magnitude of the acceleration data sample does not have a value greater than the noise-disablement threshold, then the routine 500 is repeated commencing at step 503. By applying the above-stated approach it is possible to extend the vehicular operating conditions in which the misfire detection system will detect misfires. This is because of an assurance that misfire detection can be run just up to the point of disturbance detection—at which point the misfire detection system will temporarily shut off.

Figure 6:
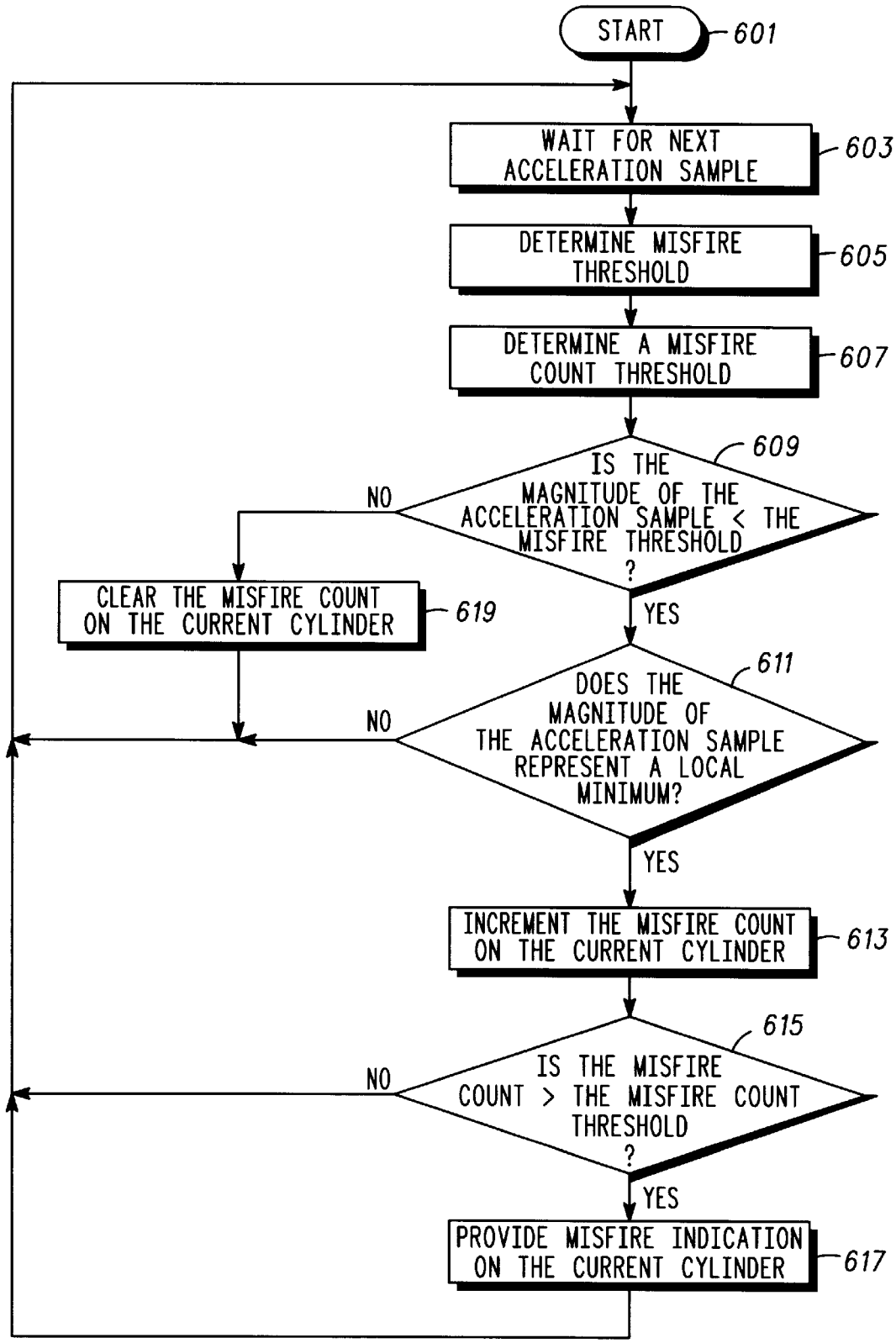
FIG. 6 is a flow chart illustrating various method steps in accordance with the preferred embodiment of the invention.

FIG. 6 is a flow chart illustrating various method steps for threshold management for indicating misfires detected in hard misfire acceleration data samples, and commences at step 601. In step 603 the method waits for a next acceleration data sample from the hard misfire acceleration data sample stream.

When the next acceleration data sample is received a misfire threshold is determined in step 605. As with the soft misfire detection routine described in FIG. 5, the misfire threshold is generally a negative number, and is preferably determined as a function of engine load, engine speed, and transmission gear.

Then, in step 607 a misfire count threshold is determined dependent on at least partially empirical testing to determine a confidence factor related to acceleration data sample integrity.

Next, in step 609 a test is made to see whether or not a magnitude of the current acceleration data sample has an amplitude less than the determined misfire threshold. If the magnitude of the acceleration data sample has a value less than the misfire threshold, then a test 611 is executed.

In step 611, a test is made to see whether or not the magnitude of the acceleration data sample represents a local minimum. This test is the same type of test as detailed in step 511 of FIG. 5. If the magnitude of the acceleration data sample represents a local minimum as determined in step 611, then a misfire count attributable to the current cylinder is incremented in step 613.

Next, in step 615 a test is made to see whether or not the misfire count for the current cylinder exceeds the earlier determined misfire count threshold. If the misfire count for the currently cylinder exceeds the misfire count threshold then in step 617 a misfire indication is provided for the current cylinder, and the routine 600 iterates commencing at step 603.

If in step 609 the test determines that the magnitude of the acceleration data sample is not less than the misfire threshold, then step 619 is executed. In step 619 the misfire count is cleared for the current cylinder. Of course each cylinder has an independent misfire count.

By applying the above-stated approach it is possible to extend the vehicular operating conditions in which the misfire detection system will detect misfires. This is because of an assurance that hard or periodic misfires will be easily identifiable.

In conclusion, an improved approach for misfire detection has been detailed above. The improved approach includes a threshold strategy that enables misfire detection over a wider variety of vehicular operating conditions by recognizing various behaviors including those associated with hard and soft misfire.

What is claimed is:

1. A method of misfire detection comprising the steps of:
   establishing a misfire threshold;
   measuring acceleration of an internal combustion engine and providing time-ordered first, second, and third acceleration data samples dependent thereon, each data sample having a magnitude less than the misfire threshold; and
   indicating a misfire when a magnitude of the second acceleration data sample has a magnitude less than a magnitude of both the first and third acceleration data samples.

2. A method in accordance with claim 1 wherein the misfire threshold is determined dependent on one or more of engine speed and engine load.

3. A method of misfire detection comprising the steps of:
   establishing a misfire threshold;
   measuring acceleration of an internal combustion engine and providing time-ordered first, second, and third acceleration data samples dependent thereon, each data sample having a magnitude less than the misfire threshold;
   determining a noise-disablement threshold dependent on one or more of engine speed, engine load, and transmission gear;
   providing a noise-disablement flag for a predetermined number of firing events when an amplitude of an acceleration data sample of the time-ordered first, second, and third acceleration data samples exceeds the noise-disablement threshold; and
   indicating a misfire when the magnitude of the second acceleration data sample has a magnitude less than the magnitude of both the first and third acceleration data samples, and the noise-disablement flag is cleared.

4. A method in accordance with claim 3 wherein the noise-disablement threshold is determined dependent on one or more of engine speed and engine load.

5. A method of misfire detection for an internal combustion engine comprising the steps of:
   measuring acceleration of an internal combustion engine and providing a odd number of time-ordered acceleration data samples dependent thereon; and
   indicating a misfire when a magnitude of an acceleration data sample median-in-time of the odd number of time-ordered acceleration data samples has a magnitude less than a misfire threshold, and less than a magnitude of at least a first and a last acceleration data sample of the odd number of time-ordered acceleration data samples.

6. A method in accordance with claim 5 wherein the misfire threshold is determined dependent on one or more of engine speed and engine load.

7. A method of misfire detection for an internal combustion engine comprising the steps of:
   measuring acceleration of an internal combustion engine and providing a odd number of time-ordered acceleration data samples dependent thereon; and
   determining a noise-disablement threshold dependent on one or more of engine speed, engine load, and transmission gear;
   providing a noise-disablement flag for a predetermined number of firing events when an amplitude of an acceleration data sample, of the odd number of time-ordered acceleration data samples, exceeds the noise-disablement threshold; and
   indicating a misfire when a magnitude of an acceleration data sample median-in-time has a magnitude less than a misfire threshold, and less than a magnitude of at least a first and a last acceleration data sample of the odd number of time-ordered acceleration data samples, and the noise-disablement flag is set, wherein the misfire threshold is determined dependent on one or more of engine speed and engine load.

8. A method in accordance with claim 7 wherein the noise-disablement threshold is determined dependent on one or more of engine speed, engine load, and engine temperature.

9. A method of misfire detection comprising the steps of:
   establishing a misfire threshold;
   establishing a misfire count threshold;
   measuring acceleration of an internal combustion engine and providing time-ordered first, second, and third acceleration data samples each sample derived from a different firing event of a same cylinder and dependent thereon, wherein each acceleration data sample has a magnitude less than the misfire threshold; and
   counting a number of times that a magnitude of the second acceleration data sample has a magnitude less than a magnitude of both the first and third acceleration data samples, and providing a misfire count responsive thereto; and
   indicating a misfire when the misfire count exceeds the misfire count threshold.

10. A method in accordance with claim 9 wherein the misfire count is determined dependent on one or more of engine speed, engine load, and engine temperature.

11. A method in accordance with claim 9 wherein the misfire threshold is determined dependent on one or more of engine speed, engine load, and engine temperature.

12. A misfire detection system comprising:
    misfire threshold determination means;
    a sensor for measuring acceleration derived from an internal combustion engine and providing time-ordered first, second, and third acceleration data samples dependent thereon, each data sample having a magnitude less than the misfire threshold; and
    a circuit for indicating a misfire when a magnitude of the second acceleration data sample has a magnitude less than a magnitude of both the first and third acceleration data samples.

* * * * *

UNITED STATES PATENT AND TRADEMARK OFFICE
CERTIFICATE OF CORRECTION

PATENT NO. : 5,841,025
DATED : November 24, 1998
INVENTOR(S) : Remboski et al.

It is certified that error appears in the above-indentified patent and that said Letters Patent is hereby corrected as shown below:

Column 8 line 29 reads "or more of engine speed, engine load, and engine temperature " should be -- engine speed and engine load --.

Column 8 line 49 - 50 reads "or more of engine speed, engine load, and engine temperature " should be -- engine speed and engine load --.

Column 8 line 52 - 53 reads "or more of engine speed, engine load, and engine temperature " should be -- engine speed and engine load --.

Signed and Sealed this

Eleventh Day of May, 1999

Attest:

Q. TODD DICKINSON

*Attesting Officer*   Acting Commissioner of Patents and Trademarks